United States Patent
Shan et al.

(10) Patent No.: US 8,729,761 B2
(45) Date of Patent: May 20, 2014

(54) MOTOR WITH AXIAL AIR GAP

(75) Inventors: Duo-Nian Shan, Kaohsiung (TW); Yuan-Jie Zheng, Kaohsiung (KR)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 222 days.

(21) Appl. No.: 13/276,427

(22) Filed: Oct. 19, 2011

(65) Prior Publication Data
US 2013/0033143 A1    Feb. 7, 2013

(30) Foreign Application Priority Data

Aug. 5, 2011 (TW) .............................. 100128075 A

(51) Int. Cl.
*H02K 21/12* (2006.01)

(52) U.S. Cl.
USPC ............ 310/156.32; 310/156.35; 310/156.38

(58) Field of Classification Search
USPC ............ 310/156.32, 156.35, 156.38, 156.45, 310/67 R
See application file for complete search history.

(56) References Cited

U.S. PATENT DOCUMENTS

| | | | |
|---|---|---|---|
| 4,594,524 A * | 6/1986 | Sudo ........................... | 310/68 R |
| 4,737,675 A * | 4/1988 | Maemine et al. ............. | 310/268 |
| 7,884,513 B2 | 2/2011 | Horng | |
| 2007/0013251 A1* | 1/2007 | Djuric ........................... | 310/113 |
| 2007/0290582 A1* | 12/2007 | Han et al. .................... | 310/68 R |
| 2010/0098560 A1 | 4/2010 | Horng et al. | |
| 2013/0009508 A1* | 1/2013 | Takamatsu et al. ...... | 310/156.35 |

FOREIGN PATENT DOCUMENTS

TW    201023481 A  *  6/2010

OTHER PUBLICATIONS

TW 201023481 A—English Machine Translation (Bing).*

* cited by examiner

*Primary Examiner* — Thanh Lam
(74) *Attorney, Agent, or Firm* — Alan Kamrath; Kamrath IP Lawfirm, P.A.

(57) ABSTRACT

A motor with an axial air gap includes a base, a rotor and a coil unit. The base has a shaft-coupling portion. The rotor has a body coupled with a permanent magnet and a shaft. The permanent magnet has inner and outer circumferential faces, and the inner and outer circumferential faces are respectively projected onto the base as inner and outer circles. The shaft is coupled with the shaft-coupling portion. The coil unit is mounted on the base and has one or more coils. The permanent magnet and the coil unit face each other. At least one coil has a periphery intersecting with the inner and outer circles. The permanent magnet has a first radial length between the inner and outer circumferential faces. At least one coil has a second radial length. The first radial length is 10% to 90% of the second radial length.

9 Claims, 6 Drawing Sheets

MOTOR WITH AXIAL AIR GAP

BACKGROUND OF THE INVENTION

1. Field of the Invention

The present invention generally relates to a motor and, more particularly, to a motor with an axial air gap.

2. Description of the Related Art

Referring to FIG. 1, a motor 8 with an axial air gap is disclosed by Taiwan Patent Publication No. 201018371 entitled "THIN DISSIPATING FAN". The motor 8 includes a base 81, an impeller 82 and a magnet plate 83. The base 81 is mounted with a coil unit 811. The impeller 82 is rotatably coupled with the base 81. The magnet plate 83 is rotatably coupled with a bottom face of the impeller 82, with an axial air gap formed between the magnet plate 83 and the coil unit 811.

When the coil unit 811 of the motor 8 is electrified to generate alternating magnetic fields, the alternating magnetic fields will drive the magnet plate 83. Magnetic lines of the magnet plate 83 have a magnetic flux linkage with the coil unit 811 through the axial air gap, thereby driving the impeller 82 to rotate. However, when viewing from the top of the motor 8, the magnet plate 83 extends way over the coil unit 811 in a radial direction. As a result, inner and outer circumferential faces of the magnet plate 83 are far away from the coil unit 811. As an undesired effect, magnetic lines emitted from the parts of the magnet plate 83 around the inner and outer circumferential faces of the magnet plate 83 may not be able to reach the coil unit 811 for a magnetic flux linkage. Those magnetic lines not contributing to the magnetic flux linking effect are called leaked magnetic fluxes, which interact with the coil unit 811 to form a high frequency resonance effect that leads to generation of noises. Therefore, the operation of the motor 8 is interfered.

Referring to FIG. 2, another motor 9 with an axial air gap is disclosed by Taiwan Publication No. 201023481 entitled "ROTOR OF A MOTOR". The motor 9 includes a rotor 91 having a permanent magnet 911. The rotor 91 is rotatably coupled with a base 92 mounted with a stator coil 93. An axial air gap exists between the stator coil 93 and the permanent magnet 911. In such an arrangement, the stator coil 93 can drive the rotor 91 to rotate via the permanent magnet 911.

When viewing from the top of the motor 9, the permanent magnet 911 is located within an axial projection range of the stator coil 93. Namely, the parts of the permanent magnet 911 around inner and outer circumferential faces of the permanent magnet 911 are covered by the axial projection range of the stator coil 93. This prevents magnetic flux leakage from happening. As such, the motor 9 does not generate much noise, and the operation thereof is not interfered. However, the ratio of radial length between the stator coil 93 and the permanent magnet 911 is not properly set, resulting in an excessive amount of material consumption of the stator coil 93 or the permanent magnet 911 and failing to meet economic needs.

SUMMARY OF THE INVENTION

It is therefore the primary objective of this invention to provide a motor with an axial air gap that prevents magnetic flux leakage. Thus, the motor does not generate much noise, and the operation thereof is not interfered.

It is another objective of this invention to provide a motor with an axial air gap that has a proper ratio of radial length between a coil unit and a permanent magnet thereof, thereby avoiding an excessive amount of material consumption.

The invention discloses a motor with an axial air gap including a base, a rotor and a coil unit. The base has a shaft-coupling portion. The rotor has a body coupled with a permanent magnet and a shaft. The permanent magnet has inner and outer circumferential faces. The inner circumferential face of the permanent magnet is projected onto the base as an inner circle, and the outer circumferential face of the permanent magnet is projected onto the base as an outer circle. The shaft is rotatably coupled with the shaft-coupling portion of the base. The coil unit is mounted on the base and has one or more coils. The permanent magnet and the coil unit face each other in an axial direction of the motor. At least one of the one or more coils has a periphery intersecting with the inner and outer circles of the projection of the permanent magnet. The permanent magnet has a first radial length between the inner circumferential face and the outer circumferential face thereof. At least one of the one or more coils has a second radial length. The first radial length of the permanent magnet is 10% to 90% of the second radial length of the at least one of the one or more coils.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
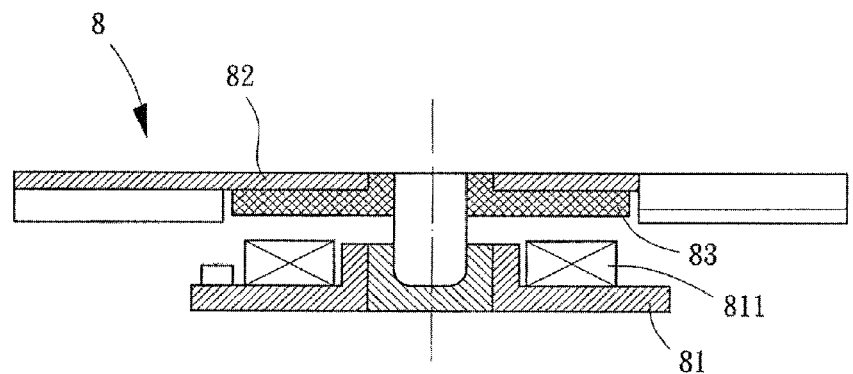
FIG. 1 is a cross-sectional view of a conventional motor with an axial air gap.
Figure 2:
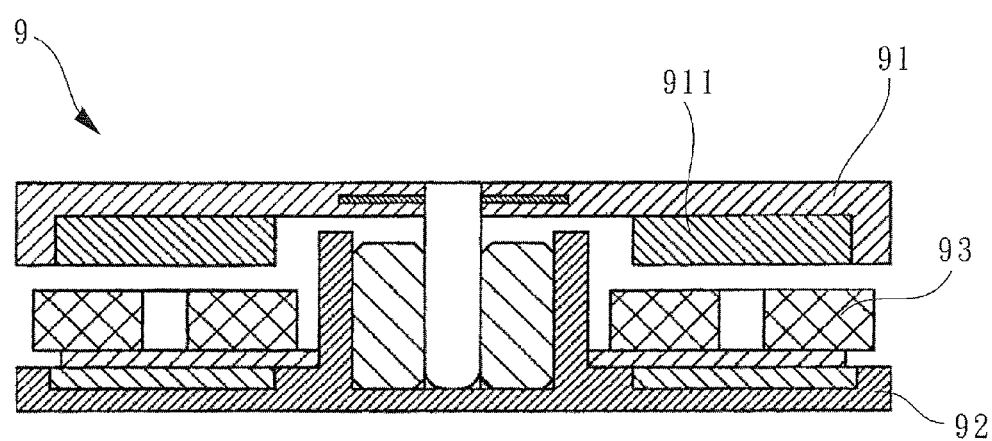
FIG. 2 is a cross-sectional view of another conventional motor with an axial air gap.

In the various figures of the drawings, the same numerals designate the same or similar parts. Furthermore, when the terms "first", "second", "third", "fourth", "inner", "outer", "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 3:
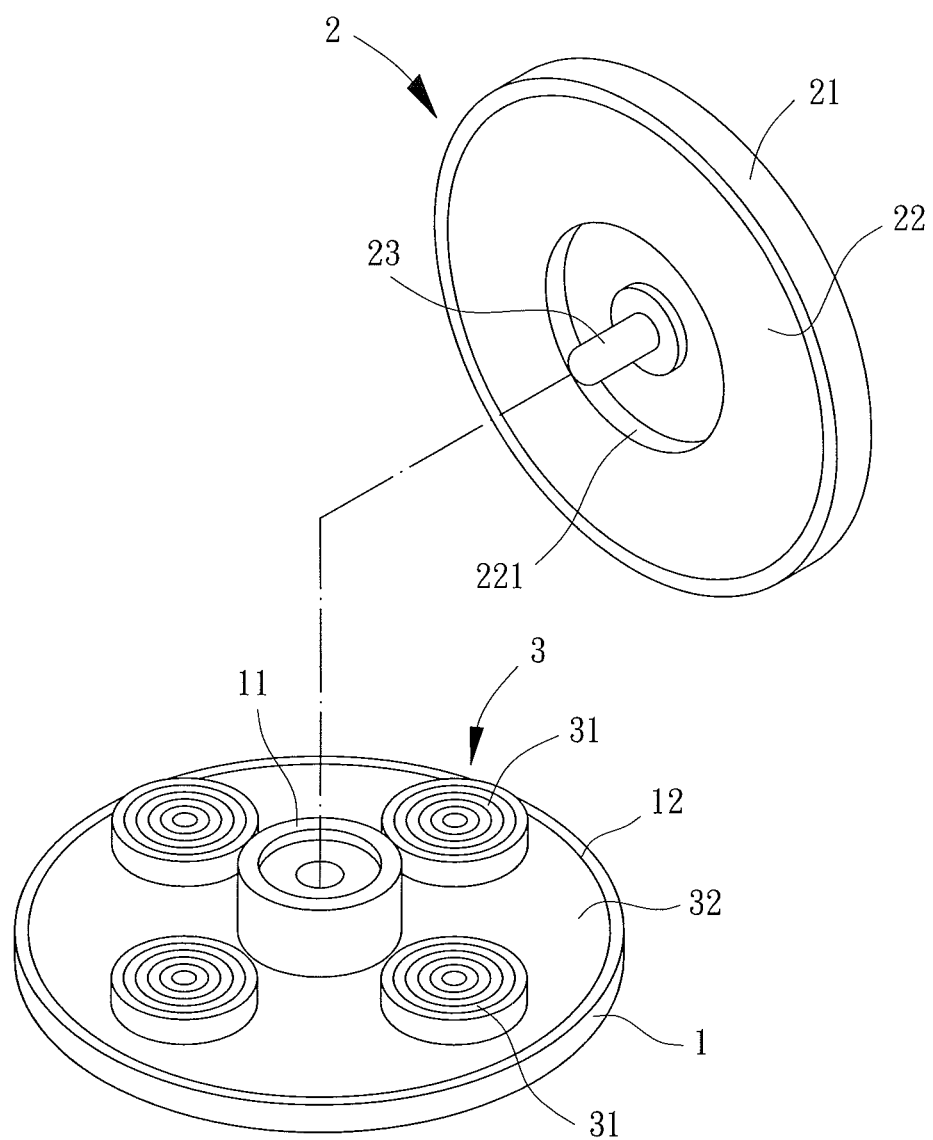
FIG. 3 is an exploded view of a motor with an axial air gap according to a preferred embodiment of the invention.
Figure 4:
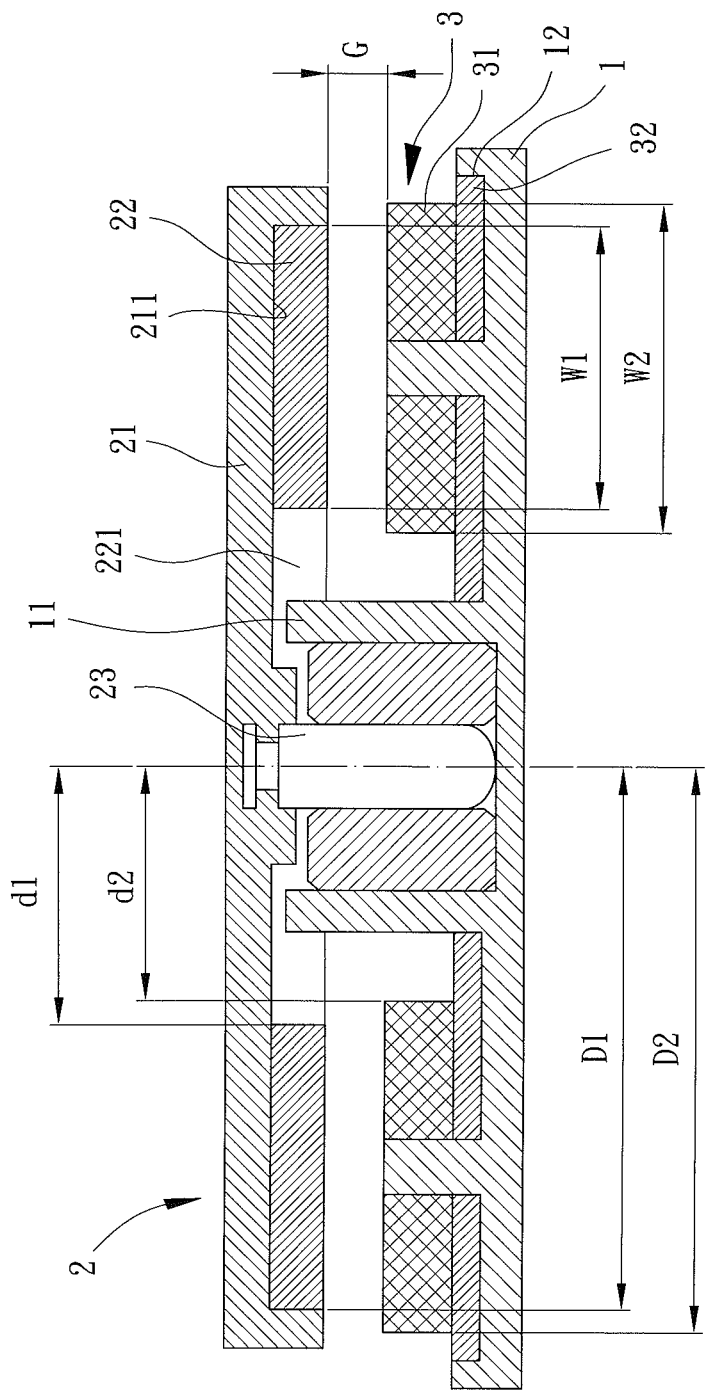
FIG. 4 is a cross-sectional view of the motor with an axial air gap of the preferred embodiment of the invention.
Figure 5:
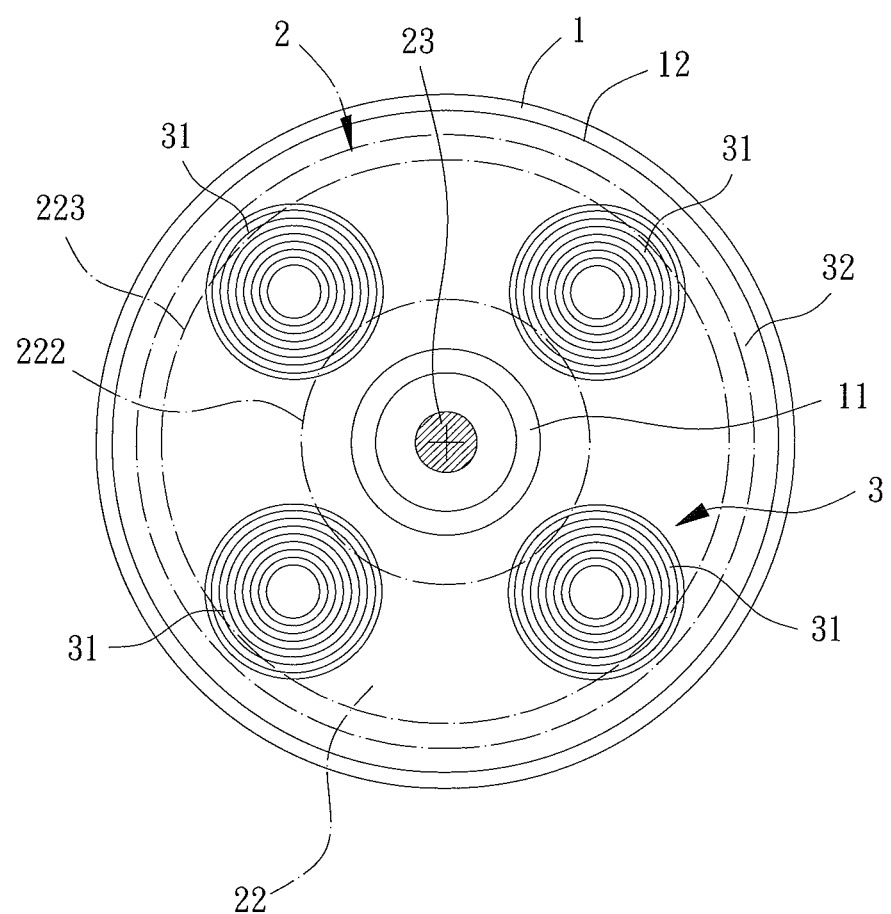
FIG. 5 is a top view of the motor with an axial air gap of the preferred embodiment of the invention.

Referring to FIGS. 3, 4 and 5, a motor with an axial air gap is disclosed according to a preferred embodiment of the invention. The motor includes a base 1, a rotor 2 and a coil unit 3. The base 1 may be coupled with the rotor 2 in a rotatable manner. The coil unit 3 is mounted on the base 1 for driving the rotor 2 to rotate.

The base 1 has a shaft-coupling portion 11 preferably in the form of a hollow tube. A bearing is received in the hollow tube, allowing the rotor 2 to be rotatably coupled with the shaft-coupling portion 11 via the bearing. The base 1 may form a concave surface 12 for receiving the coil unit 3.

The rotor 2 includes a body 21, a permanent magnet 22 and a shaft 23. One face of the body 21 facing the base 1 is defined as a coupling face 211. The permanent magnet 22 may be a circular plate having a through-hole 221. The shaft 23 can extend through the through-hole 221. The permanent magnet 22 is coupled with the coupling face 211 of the body 21. The shaft 23 has one end coupled with a center of the coupling face 211 of the body 21, as well as the other end coupled with the shaft-coupling portion 11 of the base 1. In this arrangement, the rotor 2 can be rotatably coupled with the base 1.

The coil unit 3 includes at least one coil 31 that can be electrified to generate magnetic fields with different polarities. Referring to FIG. 5, the at least one coil 31 includes four coils 31 formed on a base plate 32 by layout. The base plate 32 may be settled on the concave surface 12 of the base 1, with the shaft-coupling portion 11 of the base 1 extending through the base plate 32 to reduce the axial height of the coil unit 3. After the assembly of the motor is completed, the coil unit 3 is located between the base 1 and the rotor 2 while an axial air gap G is formed between the coil unit 3 and the permanent magnet 22.

Referring to FIG. 4, the motor with an axial air gap of the invention is characterized in that the permanent magnet 22 and the coil unit 3 face each other while magnetic lines emitted from the inner and outer circumferential faces of the permanent magnet 22 (innermost and outermost faces of the permanent magnet 22) can reach the coils 31 for magnetic flux linkage effect. In addition, the permanent magnet 22 has a first radial length W1 between an inner circumferential face (namely, the wall of the through-hole 221) and an outer circumferential face of the permanent magnet 22. The coil 31 has a second radial length W2. The first radial length W1 of the permanent magnet 22 may be 10% to 90% of the second radial length W2 of the coil 31.

Based on the technical concept above, the motor with an axial air gap of the invention may be implemented in two different ways as follows.

First, a central axial line is defined for the shaft 23 of the rotor 2. Based on this, a first outer distance D1 is defined between the central axial line of the shaft 23 and the outer circumferential face of the permanent magnet 22. The coil 31 of the coil unit 3 has an outermost point to the central axial line, with a second outer distance D2 defined between the central axial line of the shaft 23 and the outermost point. The second outer distance D2 is larger than the first outer distance D1, with the first outer distance D1 preferably being 90% of the second outer distance D2.

Second, based on the central axial line defined for the shaft 23 of the rotor 2, a first inner distance d1 is defined between the central axial line of the shaft 23 and the inner circumferential face of the permanent magnet 22. The coil 31 of the coil unit 3 has a point closest to the central axial line, with a second inner distance d2 defined between the central axial line of the shaft 23 and the point of the coil 31 closest to the central axial line. The second inner distance d2 is smaller than the first inner distance d1, with the second inner distance d2 preferably being 90% of the first inner distance d1.

Based on the disclosed structure above, the motor with an axial air gap of the invention is characterized in the ability to magnetically link the magnetic lines emitted from the permanent magnet 22, especially from the inner and outer circumferential faces of the permanent magnet 22, to the coil unit 3. This is achieved by locating the inner and outer circumferential faces of the permanent magnet 22 in the axial projection range of the permanent magnet 22. This prevents magnetic flux leakage from happening, thereby reducing noise, and ensuring normal operation of the motor. Furthermore, since the first radial length W1 of the permanent magnet 22 is anywhere from 10% to 90% of the second radial length W2 of the coil 31, a proper ratio of radial length between the permanent magnet 22 and the coil unit 3 can be determined, avoiding an excessive amount of material consumption of the coils 31 of the coil unit 3.

To prove the motor with an axial air gap of the invention is efficient in reducing noise, generated during rotation of the rotor 2, two motors with an axial air gap (which are called first and second tested motors hereinafter) are provided for a noise test below.

Figure 6:
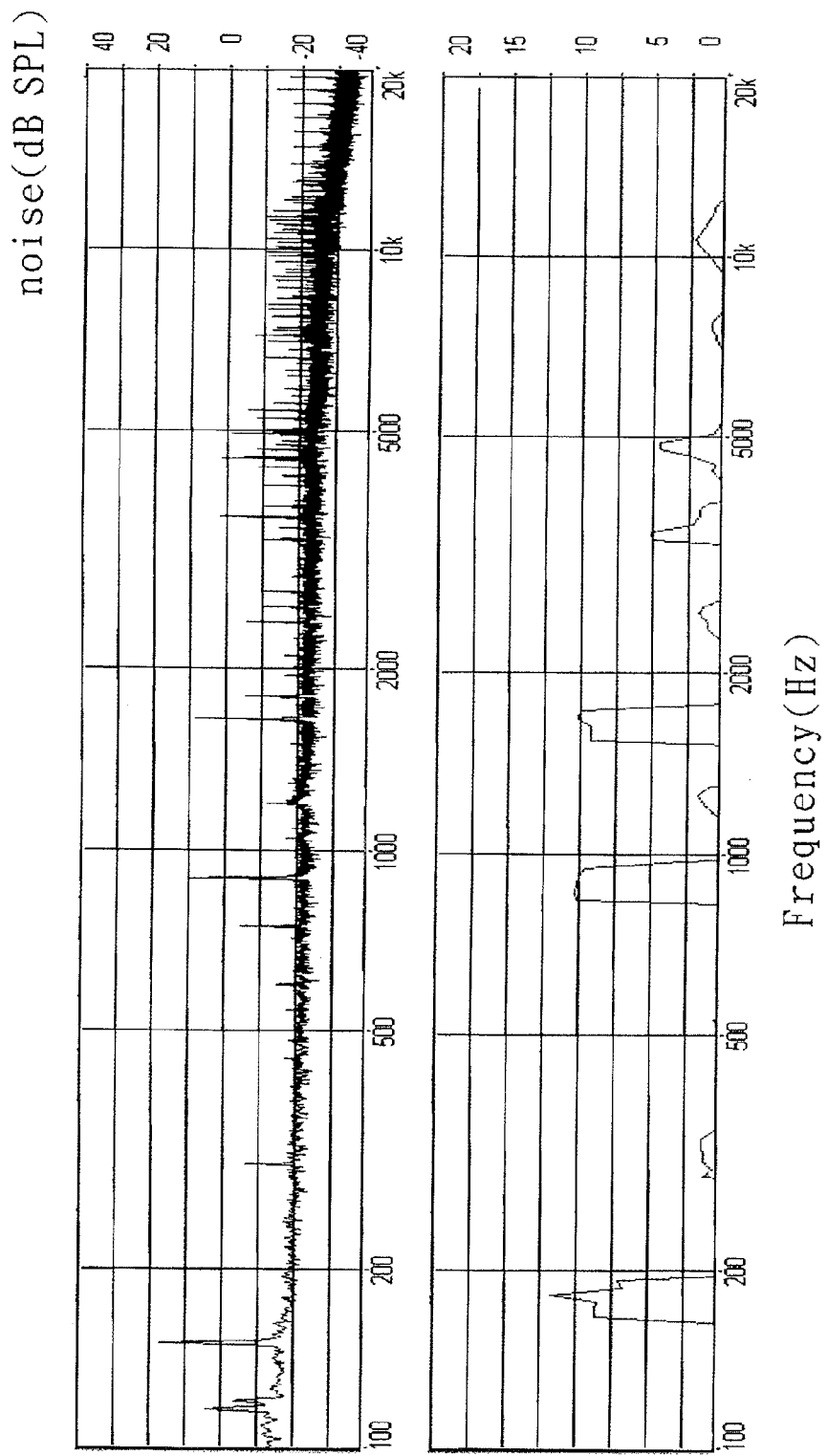
FIG. 6 shows a result of a noise test for a certain conventional motor with an axial air gap.

FIG. 6 shows a test result of the first tested motor whose first radial length W1 and second radial length W2 do not satisfy the proposed ratio (10% to 90%). It is shown in FIG. 6 that the first tested motor has more surges. In other words, more noise is generated by the first tested motor during operation thereof.

Figure 7:
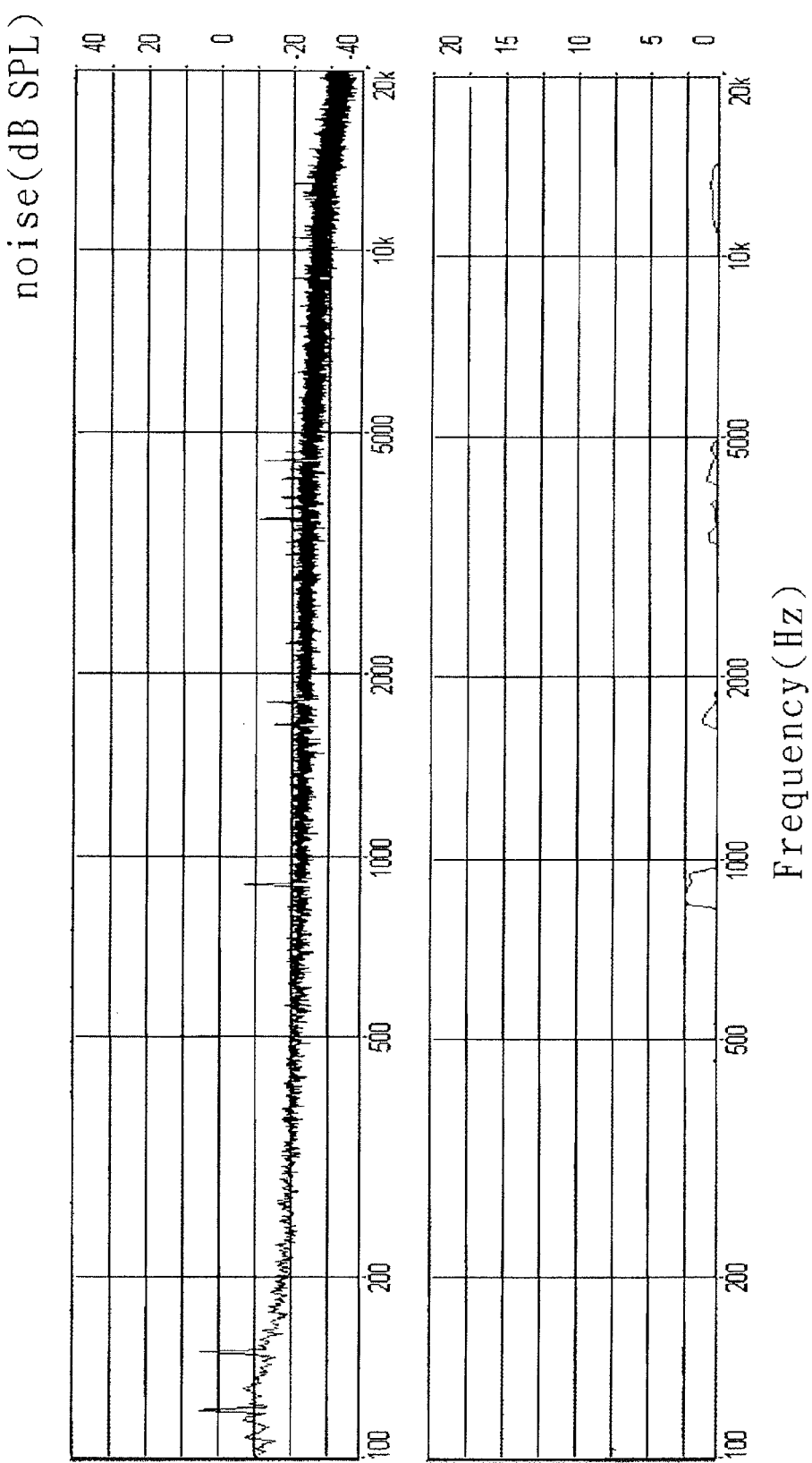
FIG. 7 shows a result of the noise test for the motor with an axial air gap of the preferred embodiment of the invention.

FIG. 7 shows a test result of the second tested motor whose first radial length W1 and second radial length W2 satisfy the proposed ratio (10% to 90%). It is clearly shown that the second tested motor generates much less surges than the first tested motor does. In other words, lesser noise is generated by the second tested motor during operation thereof.

In addition, referring back to FIG. 5, the inner circumferential face of the permanent magnet 22 is straight downwardly projected onto the base 1 as an inner circle 222, and the outer circumferential face of the permanent magnet 22 is straight downwardly projected onto the base 1 as an outer circle 223. Based on this, the periphery of each coil 31 intersects with the inner and outer circles 222 and 223 of the projection of the permanent magnet 22. In such an arrangement, it can be ensured that the magnetic lines emitted from the inner and outer circumferential faces of the permanent magnet 22 (innermost and outermost faces of the permanent magnet 22) can reach the coils 31 for a magnetic flux linkage effect.

In summary, the motor with an axial air gap of the invention does efficiently prevent magnetic flux leakages of the permanent magnet 22. Therefore, noise is prevented to provide better motor quality. Since the radial length between the coil unit 3 and the permanent magnet 22 satisfies the proper ratio of 10% to 90%, excessive material consumption of the coils 31 or the permanent magnet 22 can be avoided, reducing the costs for economic purpose.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor with an axial air gap, comprising:
a base having a shaft-coupling portion integrally extending therefrom and one or more coupling protrusions integrally extending therefrom;
a rotor having a body coupled with a permanent magnet and a shaft, wherein the permanent magnet has inner and outer circumferential faces, the inner circumferential face of the permanent magnet is projected onto the base as an inner circle, the outer circumferential face of the permanent magnet is projected onto the base as an outer circle, and the shaft is rotatably coupled with the shaft-coupling portion of the base; and
a coil unit mounted on the base and having a base plate and one or more coils formed on the base plate, with the one or more coupling protrusions of the base extending through the base plate, with each of the one or more coils winding around a respective one of the one or more coupling protrusions, and with the base plate extending outwards beyond the one or more coils in a radial direction of the shaft-coupling portion;

wherein the permanent magnet and the coil unit face each other in an axial direction of the motor, at least one of the one or more coils has a periphery intersecting with the inner and outer circles of the projection of the permanent magnet, the permanent magnet has a first radial length between the inner circumferential face and the outer circumferential face thereof, at least one of the one or more coils has a second radial length, and the first radial length of the permanent magnet is 10% to 90% of the second radial length of the at least one of the one or more coils.

2. The motor with the axial air gap as claimed in claim 1, wherein a central axial line is defined for the shaft of the rotor, a first outer distance is defined between the central axial line of the shaft and the outer circumferential face of the permanent magnet, at least one of the one or more coils of the coil unit has an outermost point to the central axial line, a second outer distance is defined between the central axial line of the shaft and the outermost point, and the second outer distance is larger than the first outer distance.

3. The motor with the axial air gap as claimed in claim 2, wherein the first outer distance is 90% of the second outer distance.

4. The motor with the axial air gap as claimed in claim 1, wherein a central axial line is defined for the shaft of the rotor, a first inner distance is defined between the central axial line of the shaft and the inner circumferential face of the permanent magnet, at least one of the one or more coils of the coil unit has a point closest to the central axial line, a second inner distance is defined between the central axial line of the shaft and the point of the at least one of the one or more coils closest to the central axial line, and the second inner distance is smaller than the first inner distance.

5. The motor with the axial air gap as claimed in claim 4, wherein the second inner distance is 90% of the first inner distance.

6. The motor with the axial air gap as claimed in claim 1, wherein the one or more coils are formed on the base plate by layout.

7. The motor with the axial air gap as claimed in claim 6, wherein the base forms a concave surface, the base plate is disposed on the concave surface of the base, and the shaft-coupling portion of the base extends through the base plate.

8. The motor with the axial air gap as claimed in claim 1, wherein the shaft-coupling portion is in the form of a hollow tube, a bearing is received in the hollow tube, and the shaft of the rotor is coupled with the bearing.

9. The motor with the axial air gap as claimed in claim 1, wherein the permanent magnet is a circular plate having a through-hole, and the shaft of the rotor extends through the through-hole.

* * * * *